Patented Dec. 6, 1949

2,490,572

UNITED STATES PATENT OFFICE 2,490,572

RHODACYANINE DYES AND A METHOD OF PREPARING THE SAME

Alfred W. Anish, Vestal, N. Y., assignor to General Aniline & Film Corporation, New York, N. Y., a corporation of Delaware No Drawing. Application June 12, 1945,
Serial No. 599,125

2 Claims. (Cl. 260—240)

The invention relates to cyanine dyes and a method of preparing the same.

Classes of sensitizing dyes which are receiving particular attention in recent years are those characterized as the merocyanine dyes. These dyes comprise a heterocyclic nitrogenous nucleus of the type usual in cyanine dyes linked either directly or through a methenyl chain to the methylene carbon atom of a rhodanine or a thiohydantoin ring system. The merocyanine dyes have been converted into rhodacarbocyanine dyes by reacting the merocyanines with an alkyl salt whereby the rhodanine nitrogen is quaternized and the thioketo group thereof is converted into a thioalkyl group. The product so formed is reacted with a cyclammonium quaternary salt containing an active methyl or methylene group in $\alpha$-position to the ring nitrogen atom or with a heterocyclic methylene group. In these compounds, it may be stated that in effect the dye has assumed an additional chromophore. As was to be expected, these rhodacarbocyanine dyes sensitize to a longer wave-region than the corresponding merocyanines.

It is an object of the present invention to provide new cyanine dyes having a sensitizing action for a wave-length shorter than that of the merocyanine dyes.

Another object of the invention is to provide a simple and efficient method of preparing such dyes.

I have now discovered that by reacting the thioethers of the merocyanines with an aliphatic or substituted aliphatic compound containing a reactive methylene group, a class of cyanines is obtained which likewise assume an additional chromophore, but which chromophore is unlike that found in rhodacarbocyanine type dyes.

It has been further found that these new dyes sensitize to wave lengths shorter than the wave lengths sensitized by the merocyanine dyes from which the new dyes are synthesized. This discovery is wholly unexpected and surprising, since it was to be assumed that in the new compounds as in the rhodacarbocyanines the introduction of an additional chromophore would cause the new dyes to sensitize for wave-lengths of the spectrum which are much longer than the wave-lengths for which the corresponding merocyanines sensitize.

The new dyes may be represented by the general formula:

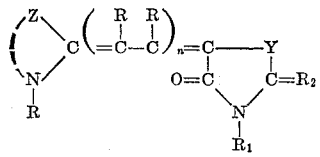

wherein Z represents the atoms necessary to complete a heterocyclic nitrogenous ring system of the type usual in cyanine dyes, such as benzoxazole, benzthiazole, benzselenazole, benzimidazole, quinoline, indoline, pyridine, thiazoline, selanazoline and the like, R is a member of the group consisting of alkyl, i. e., methyl, ethyl, propyl, isopropyl, butyl, amyl, decyl, etc., aryl, i. e., phenyl, naphthyl, chlorophenyl, nitrophenyl, toluyl, anisidyl, et., aralkyl, i. e., benzyl, methylnaphthyl, etc., and H, $R_1$ is a member of the group consisting of alkyl, aryl or aralkyl, as above, or alkenyl, i. e., allyl, vinyl, etc., and H, $R_2$ is a disubstituted methylene group, the carbon atom of which is linked to the heterocyclic ring, such as

wherein $R_4$ and $R_5$ are the same or different members selected from the group consisting of cyanogen, acyl, i. e., acetyl, propionyl, butryl, etc., acyloxy, alkyl carbamyl, aryl carbamyl, aralkyl carbamyl the acyl, alkyl, aryl and aralkyl portions of which are the same as above, and cycloammonium base such as benzthiozole, quinoline, benzselenazole, etc., Y is O, Se or S, and $n$ is 0, 1, or 2.

These dyes are prepared by reacting a compound of the formula:

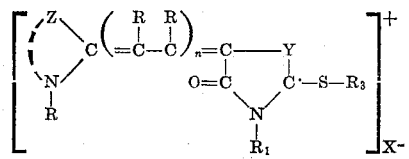

wherein R and $R_1$ are the same as above, $R_3$ is alkyl, aryl, or aralkyl, as above, and X is an anion such as chloride, bromide, iodide, perchlorate, sulfate, sulfonate, nitrate, acetate, thiocyanate, or any other acid radical capable of forming an alkyl, aryl or aralkyl ester, with a compound having an active methylene group in an aliphatic chain, in the presence of an alkaline condensing agent such as pyridine, dimethylamine, trimethylamine, sodium methylate, sodium ethylate, sodium hydroxide and the like. A specific reaction with acetoacetic ester may be represented by the following equation:

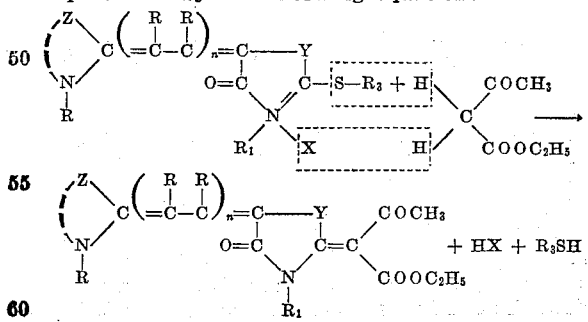

The merocyanines which can be used in the preparation of the trinuclear cyanine bases in addition to those employed in Examples 1 to 9, hereinafter appearing, are described in United States Patents 2,161,331; 2,265,908; 2,120,804; 2,272,163 and British Patents 487,051 and 489,335. Typical merocyanines which can be employed include: 5-(3-ethyl-1-benzthiazolylidene) - 3-phenyl-rhodanine, 3 - methyl - dihydrobenzthiazolylidene- 2:5'-ethylidene-3'-ethyl-rhodanine, 3-methyl-dihydrobenzthiazolylidene - 2:5'-isopropylidene-3'-ethyl-rhodanine, α-(3-ethyl-dihydrobenzthiazolylidene)-2:5'-isobutylidene - 3'-ethyl-rhodanine, 2-thio-3-ethyl-4-keto - tetrahydrothiazolylidene- 5:2'-isopropylidene - 3'-methyl-dihydrobenzthiazole, 3-ethyl-2-thio-4-keto-5-(N-methyldihydrobenzoxazolylidene) -tetrahydrothiazole, 3-ethyl- 2-thio-4-keto-5 - (N-methylidihydrobenthiazolylidene-1-ethylidene)-tetrahydrothiazole and the like.

The dyes of the present invention have a sensitizing action for a wave-length in a region shorter than the region of the merocyanines from which they are prepared.

Example I 2-(carbanilinoaceto methylidene)-3-allyl-5-[β-(3'-ethyl benzoxazolylidene) ethylidene] dihydrothiazolone-4

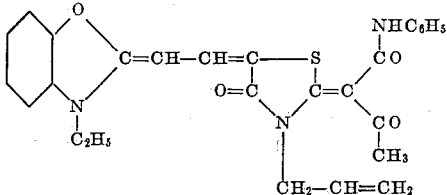

6.8 grams of the merocyanine prepared from 2-methyl benzoxazole ethiodide and 5-acetanilidomethylene-3-allyl rhodanine are mixed with 10 cc. of dimethyl sulfate, heated at 110° C. for 10 minutes to quaternize the rhodanine nitrogen and convert the thioketo group to the thioether. The mixture is then cooled to room temperature, and 3.5 grams of aceto-acetanilide are added. The mixture is chilled and 80 cc. of pyridine are added. After refluxing for 30 minutes, the mixture is cooled, salt solution added, and then allowed to stand. The dye crystals thus salted out are filtered, washed with water, then with ether and finally with ethyl acetate. The dye is recrystallized from ethyl alcohol. It has a sensitizing range extending to 580 mu with a maximum at 540 mu.

Example II 2-(acetocarbethoxy methylidene)-3-allyl-5-[β-(3'-ethyl benzoxazolylidene-2') ethylidene] dihydrothiazolone-4

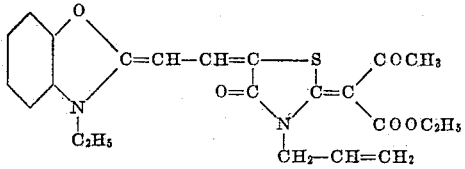

6.8 grams of the merocyanine prepared from 2-methyl benzoxazole ethiodide and 3-allyl-5-acetanilidomethylene rhodanine are mixed with 10 grams of dimethyl sulfate, and heated at 110° C. for 10 minutes. The mixture is chilled and 2.4 grams of aceto-acetic acid ethyl ester are added, followed by 80 cc. of pyridine. After refluxing for 30 minutes, the solution is cooled, salt solution is added, and it is allowed to stand. The dye is filtered off, washed with water, then with ether, and finally ethyl acetate. The dye is recrystallized from ethyl alcohol. It has a sensitizing range extending to 580 mu with a maximum at 540 mu.

Example III 2-(cyanocarbethoxy methylidene)-3-ethyl-5-[β-(3'-ethyl benzthiazolylidene) ethylidene] dihydrothiazolone-4

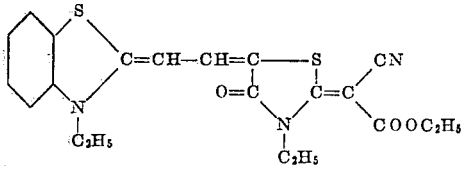

7.4 g. of the merocyanine prepared from 2-methyl benzthiazole ethiodide and 3-allyl-5-acetanilidomethylene rhodanine are mixed with 10 cc. of dimethyl sulfate and heated at 110° C. for 10 minutes. The mixture is chilled, and 2.0 g. of ethyl cyanoacetate are added, followed by 80 cc. of pyridine. The mixture is refluxed for 30 minutes, cooled and diluted with water. After standing for some time, the dye crystals are filtered, washed with water, then with ether and finally with ethyl acetate. The dye is recrystallized from ethyl alcohol. It has a sensitizing range extending to 610 mu with a maximum at 560 mu.

Example IV 2-(dibenzoyl methylidene)-3-allyl-5-[α-ethyl-β-(3'-ethyl-6'-methoxy benzselenazolylidene-2'') ethylidene] dihydrothiazolone-4

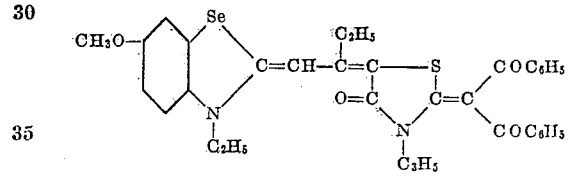

9.4 g. of the merocyanine prepared from 2-methyl-6-methoxy benzselenazole ethiodide and 5 - acetanilidomethylene - 3 - allyl rhodanine are mixed with 15.0 cc. dimethyl sulfate and heated at 110° C. for 10 minutes and reacted with 4.5 g. dibenzoylmethane in the usual manner. The dye which was isolated had a sensitization extending to 580 mu with a maximum at 540 mu.

Example V 2-(2'-acetobenzthiazolyl methylidene)-3-allyl-5-[β-(3''-ethyl-6''-methylbenzthiazolylidene-2'') ethylidene] dihydrothiazolone-4

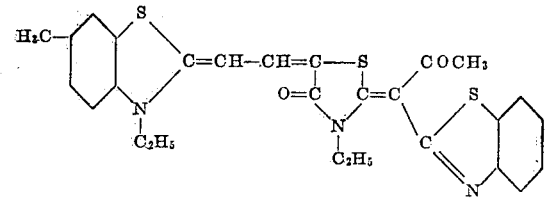

7.5 g. of merocyanine prepared from 2,6-dimethyl benzthiazole ethiodide and 3.8 g. of acetonyl benzthiazole were reacted and isolated in the same manner as Example 3. The resulting dye sensitized to 640 mu with a maximum at 560 mu.

Example VI 2-(2'-benzathiazolylaceto methylidene)-3-allyl-5-[β-(3''-ethyl-6''-methoxy benzselenazolylidene-2) ethylidene] dihydrothiazolone-4

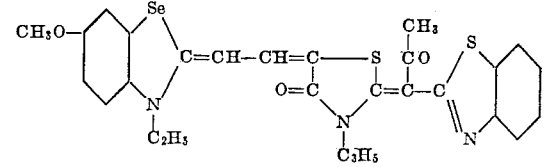

8.3 g. of merocyanine prepared from 2-methyl- 6-methoxy-benzselenazole ethiodide and 3-allyl-5-acetanilidomethylene-2-thio-thiazolone-4 was reacted with methyl sulfate in the usual manner and coupled with 3.8 g. of 2-acetonyl benzthiazole. The resulting dye had an absorption maximum in alcoholic solution at 524 mu and sensitized to 640 mu with a maximum at 560 mu.

*Example VII*

2(2'-benzthiazolylbenzoyl methylidene)-3-allyl-5-[β-(3''-ethyl-6''-methoxybenzselenazolylidene-2'') ethylidene] dihydrothiazolone-4

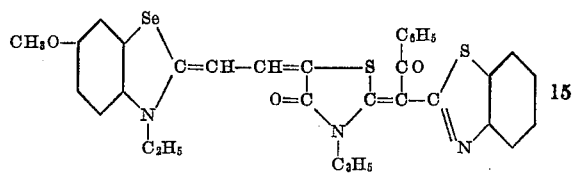

8.3 g. of merocyanine prepared from 2-methyl-6-methoxy benzseleneazole ethiodide and 3-allyl-5-acetanilido methylene-2-thio-thiazolone-4 was reacted with methyl sulfate in the usual manner and coupled with 5.0 g. phenacyl benzthiazole. The resulting dye had an absorption maximum in alcoholic solution at 540 mu and had a sensitizing range extending to 670 mu with a maximum at 590 mu.

*Example VIII*

2-(2'-benzthiazolylethoxalyl methylidene)-3-allyl-5-[β-(3''-ethyl-6''-methoxy benzselenazolylidene-2'') ethylidene] dihydrothiazolone-4

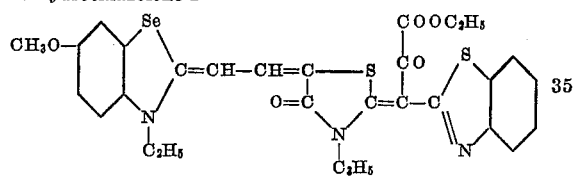

8.3 of merocyanine prepared from 2-methyl-6-methoxy benzelselenazole ethiodide and 3-allyl-5-acetanilido methylene-2-thio thiazolone-4 was reacted with methyl sulfate in the usual manner and coupled with 3.5 g. of 2-ethoxalyl benzthiazole. The resulting dye had an absorption maximum in alcoholic solution at 517 mu and had a sensitization extending to 650 mu with a maximum at 570 mu.

*Example IX*

2-(2',2'-dibenzthiazolyl methylidene)-3-allyl-5-[β-(3''-ethyl-4'',5''-diphenyl thiazolylidene-2'') ethylidene] dihydroxazolone-4

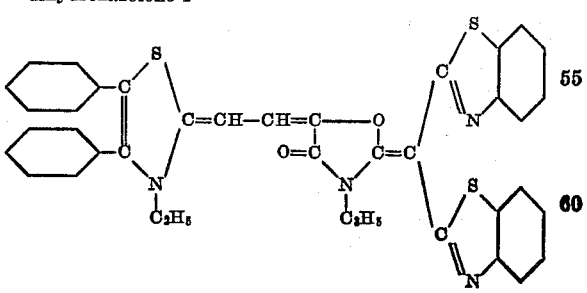

8.0 g. of merocyanine prepared from 2-methyl-4,5-diphenyl thiazole ethiodide and 3-allyl-5-acetanilidomethylene-2-thio-oxazolidine-4, was alkylated, quaternized and reacted with 5.0 g. bis-benzthiazolyl methane in a manner similar to Example 3. The resulting dye had an absorption maximum at 640 mu in alcohol solution and sensitized with a maximum at 610 mu.

I claim:
1. A dye of the general formula:

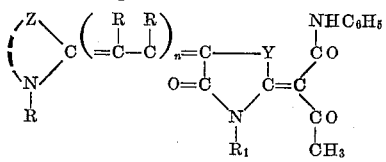

wherein Z represents the atoms necessary to complete a heterocyclic nitrogenous ring system of the type usual in cyanine dyes, R is a member of the group consisting of alkyl, aryl, aralkyl, and hydrogen, R₁ is a member of the group consisting of alkyl, aryl, aralkyl, alkenyl and H, Y is selected from the group consisting of O, Se, and S, and n is selected from the group consisting of 0, 1, and 2.

2. A dye of the formula:

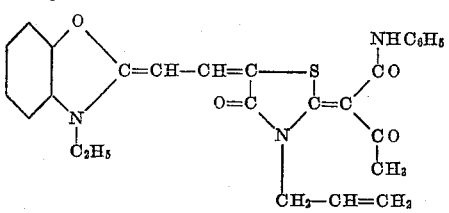

ALFRED W. ANISH.

REFERENCES CITED

The following references are of record in the file of this patent:

UNITED STATES PATENTS

| Number | Name | Date |
|---|---|---|
| 1,950,421 | Wahl | Mar. 13, 1934 |
| 2,028,141 | Ackerman | Jan. 21, 1936 |
| 2,280,253 | Muller | Apr. 21, 1942 |
| 2,322,015 | Hamer | June 15, 1943 |
| 2,385,747 | Freyberg | Sept. 25, 1945 |
| 2,388,963 | Fry | Nov. 13, 1945 |

FOREIGN PATENTS

| Number | Country | Date |
|---|---|---|
| 509,927 | Great Britain | 1939 |